(12) United States Patent
Zahirovic (10) Patent No.: US 11,235,302 B2
(45) Date of Patent: Feb. 1, 2022

(54) CATALYST LOADING AND UNLOADING SYSTEM FOR CHEMICAL REACTORS

(71) Applicant: Catmasters LLC, Pasadena, TX (US)

(72) Inventor: Emir Zahirovic, Copenhagen (DK)

(73) Assignee: CATMASTERS LLC, Pasadena, TX (US)

(*) Notice: Subject to any disclaimer, the term of this patent is extended or adjusted under 35 U.S.C. 154(b) by 0 days.

(21) Appl. No.: 17/099,769

(22) Filed: Nov. 16, 2020

(65) Prior Publication Data
US 2021/0146326 A1    May 20, 2021

Related U.S. Application Data

(60) Provisional application No. 62/935,510, filed on Nov. 14, 2019.

(51) Int. Cl.
*B01J 8/00* (2006.01)
*B01J 8/02* (2006.01)
*B01J 8/06* (2006.01)

(52) U.S. Cl.
CPC .................. *B01J 8/003* (2013.01); *B01J 8/06* (2013.01); *B01J 2208/00752* (2013.01); *B01J 2208/00769* (2013.01)

(58) Field of Classification Search
CPC ... B01J 8/00; B01J 8/0015; B01J 8/003; B01J 8/02; B01J 8/06; B01J 2208/00; B01J 2208/00743; B01J 2208/00752; B01J 2208/00769
See application file for complete search history.

(56) References Cited

U.S. PATENT DOCUMENTS

| | | | |
|---|---|---|---|
| 5,154,271 A | 10/1992 | Binzen | |
| 7,959,870 B2* | 6/2011 | Yanokuchi | B65G 53/60 422/219 |
| 8,876,439 B2* | 11/2014 | Sheehan | B01J 8/0015 406/168 |
| 8,948,910 B2 | 2/2015 | Cottard et al. | |
| 2009/0097958 A1 | 4/2009 | Camoriano | |
| 2014/0037419 A1 | 2/2014 | Ramos et al. | |

FOREIGN PATENT DOCUMENTS

| | | | | |
|---|---|---|---|---|
| FR | 2829107 A1 * | 3/2003 | ............. | B01J 8/025 |
| JP | 2010207756 A | 9/2010 | | |

OTHER PUBLICATIONS

Machine translation of FR 2829107 A1, which was published on Mar. 7, 2003. (Year: 2003).*

* cited by examiner

*Primary Examiner* — Natasha E Young (57) ABSTRACT

A catalyst loading and unloading system for chemical reactors has an extendable catalyst transfer tube that is fed by a catalyst hopper and controlled by a tube displacement mechanism; more particularly, by a winch mechanism. As the reactor chamber fills with catalyst, a lower end of the extendable catalyst transfer tube is displaced upward by the tube displacement mechanism to correspond with the rising height of the catalyst bed within the chamber. The extendable catalyst transfer tube may further be used to vacuum old catalyst out of the reactor chamber.

9 Claims, 9 Drawing Sheets

CATALYST LOADING AND UNLOADING SYSTEM FOR CHEMICAL REACTORS

The current application claims a priority to the U.S. Provisional Patent application Ser. No. 62/935,510 filed on Nov. 14, 2019. The current application is filed on Nov. 16, 2019, whereas Nov. 14, 2019 and Nov. 15, 2019 were on a weekend.

FIELD OF THE INVENTION

The present invention relates generally to a catalyst for a chemical reactor. More specifically, the present invention relates to increasing the safety and quality of loading and unloading of catalysts to and from a chemical reactor.

BACKGROUND OF THE INVENTION

A device that provides safe handling of catalysts and that increases the quality of catalysts when loaded to a reactor is in demand. Catalysts are present in all oil refineries as well as in chemical and petrochemical plants. They make many processes possible or reduce the energy required for chemical reactions to occur. These reactions take place in chemical reactors, which are loaded with the catalyst (making them catalytic reactors).

Depending on the reactor type, the catalyst installation/uninstallation is performed using different methods, but the common characteristic of all these methods is that operators (technicians) are working in a confined space for extended periods. The catalyst can be manually poured or scooped into buckets and other containers, such as hoppers with a calibrated volume, or otherwise handled and transferred into the reactor vessel. Sometimes, a crane can be used to hold the super sack of catalyst above the reactor vessel while the catalyst is gradually emptied and loaded into the reactor using a sock-like outlet hose. However, flat open space to stage and store catalysts is frequently limited and working space for operators is confined to the area surrounding the reactor. Because the confined space is a special category of working environment, the safety standards and procedures are extremely high and extensive, respectively. Consequently, all activities related to the catalyst replacement are time consuming and affect processing unit utilization time. Finally, accidents, including fatalities, can occur during catalyst replacement activities.

The catalyst for hydroprocessing reactors can be loaded using the sock or dense loading method. In the sock loading method, the operator must move constantly to avoid causing height differences of the loaded catalyst. In addition, the operator must use snowshoes or walk on the panels to avoid breaking the catalyst pellets. In the dense loading method, whereby the catalyst pellets are sprayed onto the reactor space, to maintain spraying of the catalyst over the reactor cross section, the machine must be stopped periodically and the rotational speed should be adjusted for the new falling height. Catalyst is typically a brittle, fragile material and is highly expensive, so it is desirable to keep the catalyst intact as much as possible and to avoid breaking or crushing it. Thus, any stopping and starting of the catalyst loading by dense loading machines will increase the breakage of the catalyst pellets and decrease the quality of loading.

Another problem with conventional loading/unloading methods is the requirement for the machine operator's presence in the reactor. The hydroprocessing reactors, for example, sometimes require the operator to spend long hours more than 150 ft deep in the reactor. Any break is time consuming, and if avoided based on time pressures, it can result in serious consequences arising from the dehydration or fatigue of the operator. In addition, currently available methods of unloading require the presence of a technician, and any effort to reduce or fully eliminate this presence would directly reduce accident rates.

Thus, there is a need to decrease human presence in the reactor space, increase the quality of the catalyst loading, decrease unit off-stream time, and consequently increase the benefits to all parties.

The present invention is aimed at solving the problems associated with a conventional catalyst loading and unloading system and procedures through an innovative device designed for this purpose.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a technological solution for catalyst loading and unloading, developed by taking into account all challenges associated with traditional procedures and methods in this area. The configuration of the present invention is transformable and can be adjusted to the operation type. Currently, during catalyst loading, the typical procedure involves starting with several segments of catalyst transfer tube attached together to reach the bottom of the reactor chamber, and as the chamber is filled with catalyst, the segments are periodically removed to accommodate the rising level of catalyst bed within the chamber. The core element of the present invention is an extendable pipe system that can safely deliver the catalyst to the loading elevation without needing to interrupt the loading process in order to remove transfer tube segments.

Figure 1:
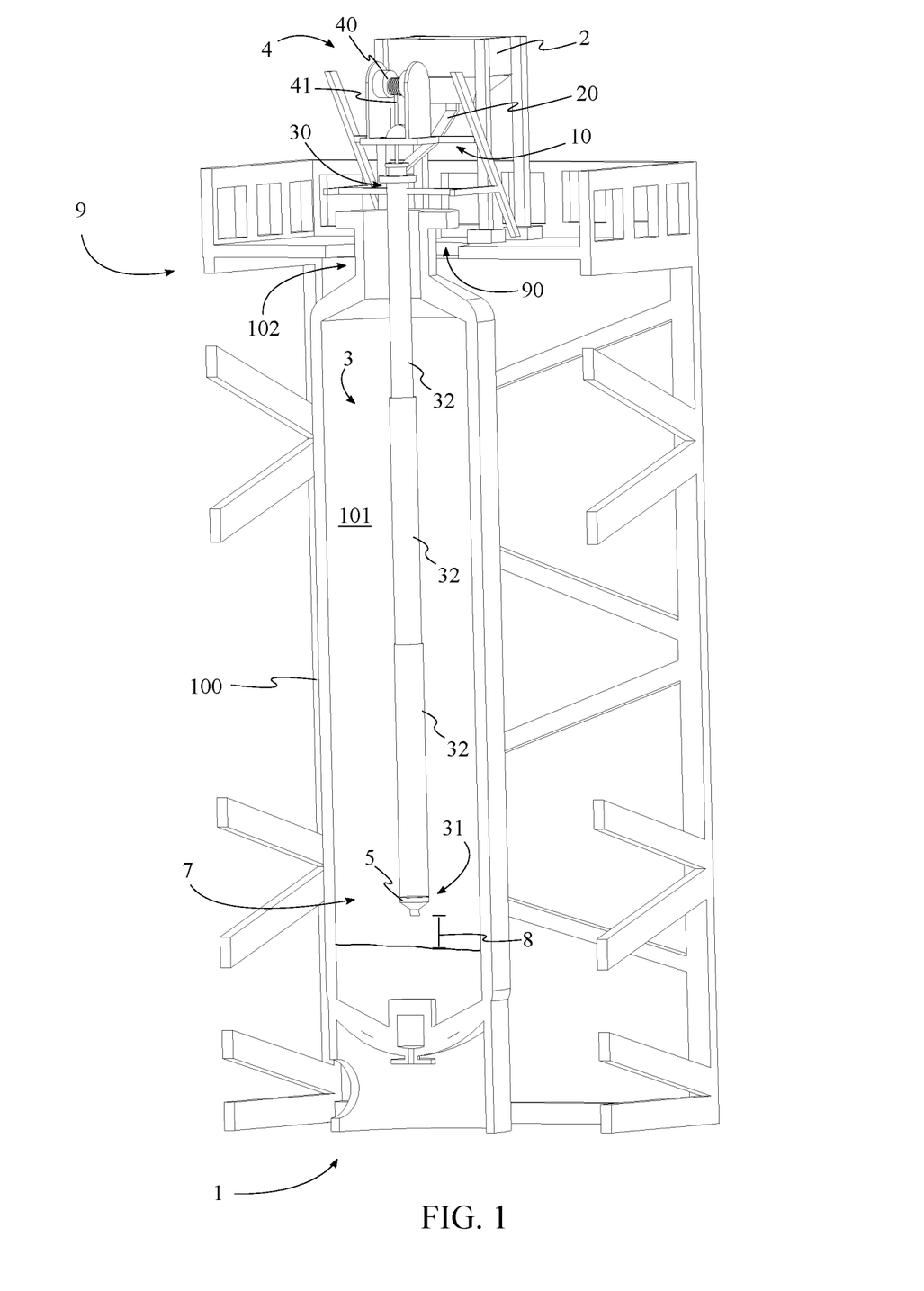
FIG. 1 is a perspective cross-sectional view of one embodiment of the present invention with the extendable catalyst transfer tube in the lowered configuration.

Generally, referring to FIG. 1, the present invention comprises a chemical reactor 1, a catalyst hopper 2, an extendable catalyst transfer tube 3, a tube displacement mechanism 4, and a catalyst flow control valve 5. The chemical reactor 1 comprises an enclosure 100, a chamber 101, and a manway 102, wherein the chamber 101 is positioned within the enclosure 100, and wherein the manway 102 traverses concentrically through the enclosure 100 into the chamber 101. The chemical reactor 1 may vary in type and shape in different embodiments, depending on situational process requirements. The catalyst hopper 2 is a typical, well-known component that functions to store a reservoir of catalyst pellets and deliver a steady flow of catalyst pellets through gravity into the extendable catalyst transfer tube 3 to finally be deposited in the chamber 101.

The extendable catalyst transfer tube 3 extends between an upper end 30 and a lower end 31. The upper end 30 of the extendable catalyst transfer tube 3 is mounted adjacent to the manway 102. The upper end 30 is fixed in place and serves as the entry point of catalyst pellets into the chamber 101 of the chemical reactor 1.

The extendable catalyst transfer tube 3 axially traverses through the manway 102 into the chamber 101, wherein the lower end 31 is positioned within the chamber 101. The catalyst hopper 2 is connected to the extendable catalyst transfer tube 3 through a hopper discharge tube 20, wherein the catalyst hopper 2 is configured to dispense catalyst pellets into the extendable catalyst transfer tube 3 through the hopper discharge tube 20. Therefore, catalyst pellets are transferred from the catalyst hopper 2 into the upper end 30 of the extendable catalyst transfer tube 3, through the length of the extendable catalyst transfer tube 3, and are dispensed from the lower end 31 into the chamber 101. The extendable catalyst transfer tube 3 may be manufactured from any suitable material including, but not limited to, nickel-molybdenum alloys, nickel-chromium alloys, silicon nitride, zirconia, alumina, carbon steel, 300 series stainless steel and the like.

The catalyst flow control valve 5 is connected adjacent to the lower end 31 of the extendable catalyst transfer tube 3 through bolting or any other secure mounting means. The catalyst flow control valve 5 functions to control the rate at which catalyst pellets are dispensed from the lower end 31 of the extendable catalyst transfer tube 3, and may be any typical type of catalyst flow control valve 5 as known in the art, such as, but not limited to, a rotary valve or a gate valve. The catalyst flow control valve 5 may be controlled manually or electronically in various embodiments.

Figure 2:
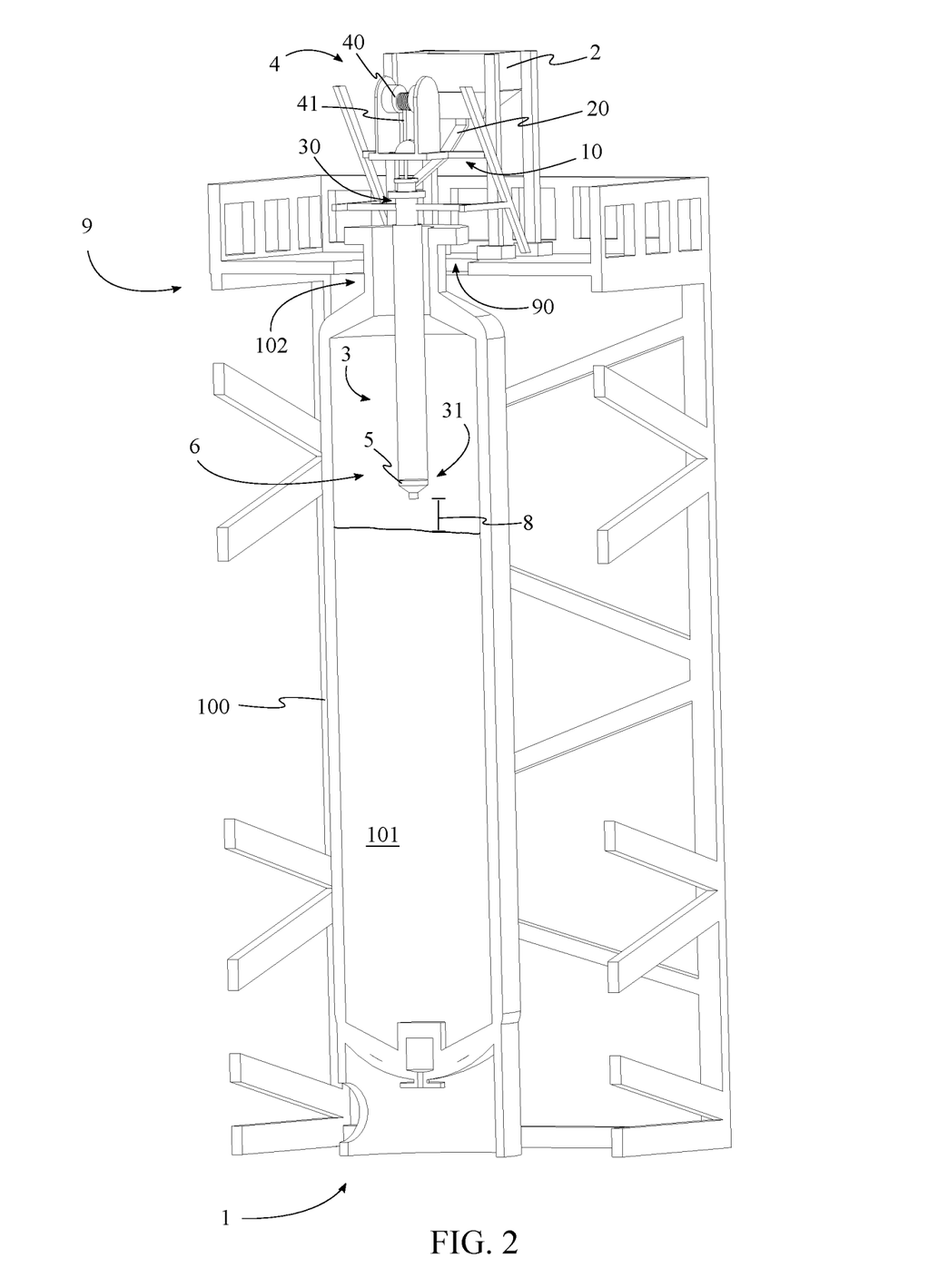
FIG. 2 is a perspective cross-sectional view of one embodiment of the present invention with the extendable catalyst transfer tube in the raised configuration.

The tube displacement mechanism 4 is operatively connected to the extendable catalyst transfer tube 3, such that the tube displacement mechanism 4 is configured to displace the lower end 31 of the extendable catalyst transfer tube 3 between a raised configuration 6 and a lowered configuration 7, as shown in FIGS. 1-2, wherein the lower end 31 of the extendable catalyst transfer tube 3 is positioned adjacent to the manway 102 in the raised configuration 6, and wherein the lower end 31 is displaced away from the manway 102 in the lowered configuration 7. In the catalyst loading process, the extendable catalyst transfer tube 3 begins in the lowered configuration 7. As the reactor chamber 101 fills with catalyst during the loading process, the height of catalyst within the chamber 101 rises and the tube displacement mechanism 4 is actuated in order to produce corresponding movement of the lower end 31 of the extendable catalyst transfer tube 3.

When filling the chamber 101 of the chemical reactor 1 with catalyst pellets, it is desirable to minimize the forces acting on the pellets in order to prevent breakage. Thus, the height from which the catalyst pellets fall before making contact should be minimized. Since the reactor is generally cylindrical in cross section and elongated axially, as catalyst is deposited into the chamber 101, the top surface of the catalyst bed will rise within the chamber 101. Thus, to maintain a proper fall distance 8, the lower end 31 of the extendable catalyst transfer tube 3 needs to move upwards within the chamber 101 proportionally to the rise of the top surface of the catalyst bed. This movement of the lower end 31 of the extendable catalyst transfer tube 3 is facilitated in the present invention through the tube displacement mechanism 4 and the extendable and retractable nature of the extendable catalyst transfer tube 3.

In some embodiments, the present invention may be understood to further comprise a platform 9 and a support frame 10, the platform 9 comprising a manway aperture 90. The support frame 10 is connected atop the platform 9 adjacent to the manway aperture 90. The manway 102 of the chemical reactor 1 traverses through the manway aperture 90 of the platform 9. The tube displacement mechanism 4 and the upper end 30 of the extendable catalyst transfer tube 3 are mounted to the support frame 10. Generally, the platform 9 serves to support the catalyst hopper 2, the upper end 30 of the extendable catalyst transfer tube 3, the tube displacement mechanism 4, and any other relevant components in the vicinity of the manway 102. The support frame 10 serves mainly to support the tube displacement mechanism 4 directly above the manway 102 but may vary in order to suit any relevant purpose in different embodiments as desired.

Figure 3:
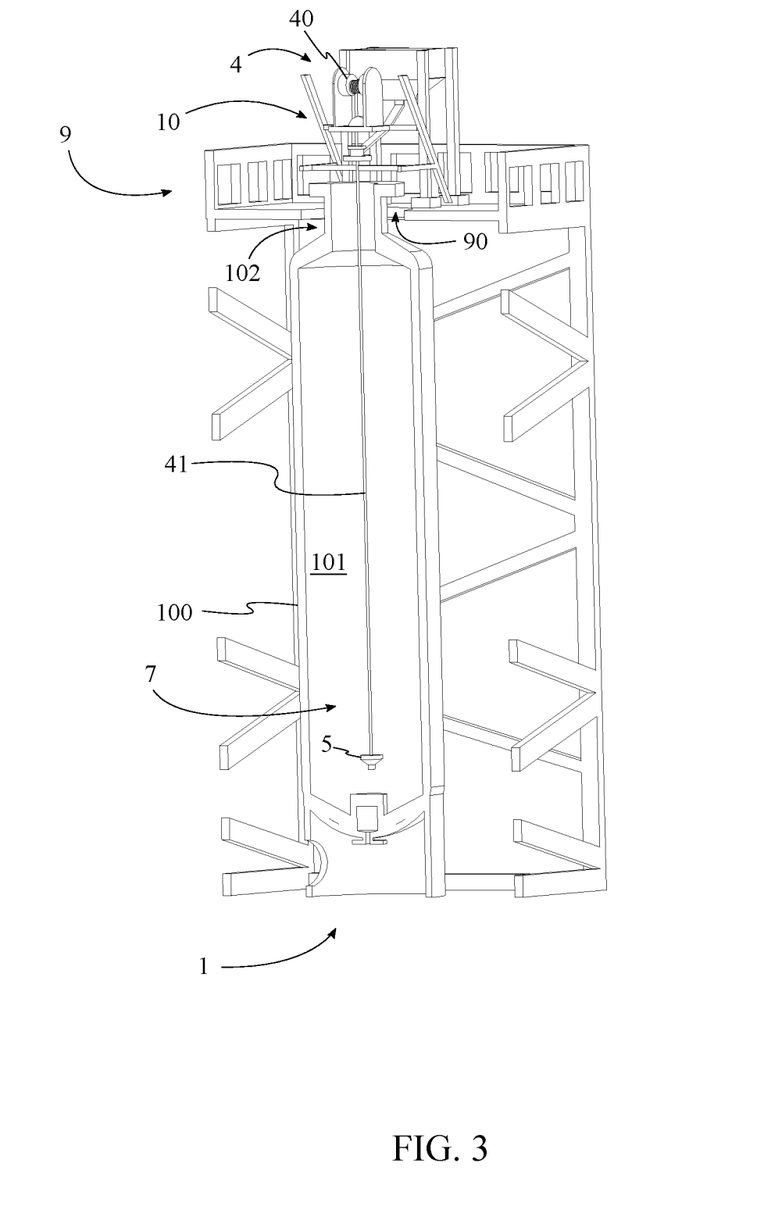
FIG. 3 is a perspective cross-sectional view of one embodiment of the present invention with the extendable catalyst transfer tube removed, showing the cable in the lowered configuration.
Figure 4:
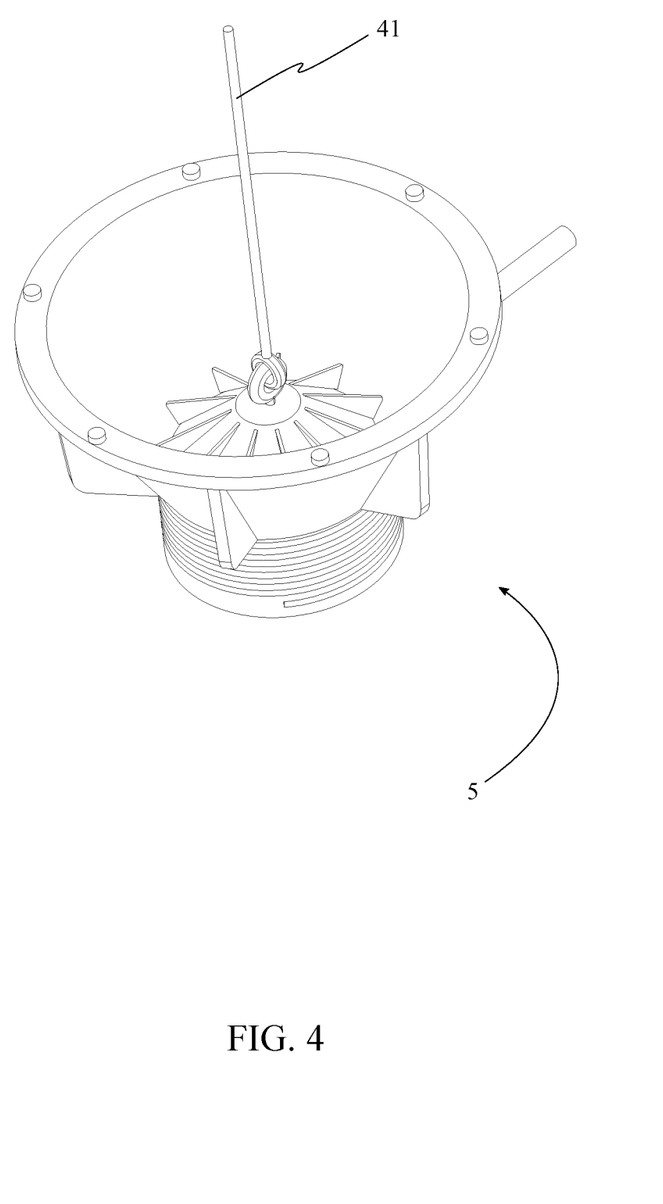
FIG. 4 is a perspective view of one embodiment of the catalyst flow control valve of the present invention connected to the cable of the tube displacement mechanism.

In the preferred embodiment of the present invention, referring to FIGS. 1-3, the tube displacement mechanism 4 comprises a winch 40 and a cable 41. Preferably, the winch 40 is mounted to the support frame 10 directly above the manway 102 to enable the most direct path of the cable 41, though the winch 40 may conceivably be mounted to the platform 9, or in any secure location. The cable 41 is connected between the winch 40 and the lower end 31 of the extendable catalyst transfer tube 3, wherein the lower end 31 of the extendable catalyst transfer tube 3 is displaced between the raised configuration 6 and the lowered configuration 7 by extending and retracting the cable 41 with the winch 40. More particularly, in the preferred embodiment of the present invention, the cable 41 is connected between the winch 40 and the catalyst flow control valve 5. Moreover, the cable 41 traverses from the winch 40 into the extendable catalyst transfer tube 3, internally through the extendable catalyst transfer tube 3, to the catalyst flow control valve 5. The cable 41 may be connected to the catalyst flow control valve 5 through any suitable means, such as, but not limited to, mating hooks, rings, or other structures on the end of the cable 41 and the catalyst flow control valve 5, as illustrated in FIG. 4.

It is contemplated herein that various means may be implemented in various embodiment of the present invention to extend and retract the extendable catalyst transfer tube 3 between the raised configuration 6 and the lowered configuration 7, as suitable and desired. However, in the preferred embodiment, referring to FIGS. 1, 5, and 6, the extendable catalyst transfer tube 3 comprises a series of tube sections 32, wherein the series of tube sections 32 progresses from the upper end 30 to the lower end 31 of the extendable catalyst transfer tube 3. The series of tube sections 32 is telescopically engaged with each other, wherein the series of tube sections 32 is telescopically collapsed in the raised configuration 6. Alternative arrangements may be implemented in other embodiments as suitable to the spirit and purpose of the present invention. For example, in some embodiments the extendable catalyst transfer tube 3 may be constructed mainly of a flexible material, so that as the tube displacement mechanism 4 displaces the lower end 31 upwards toward the manway 102, the extendable catalyst transfer tube 3 collapses through buckling. This is not ideal, however, as the folded interior wall of the extendable catalyst transfer tube 3 would create disruptions in the flow of catalyst and could potentially cause unnecessary breakage.

Figure 5:
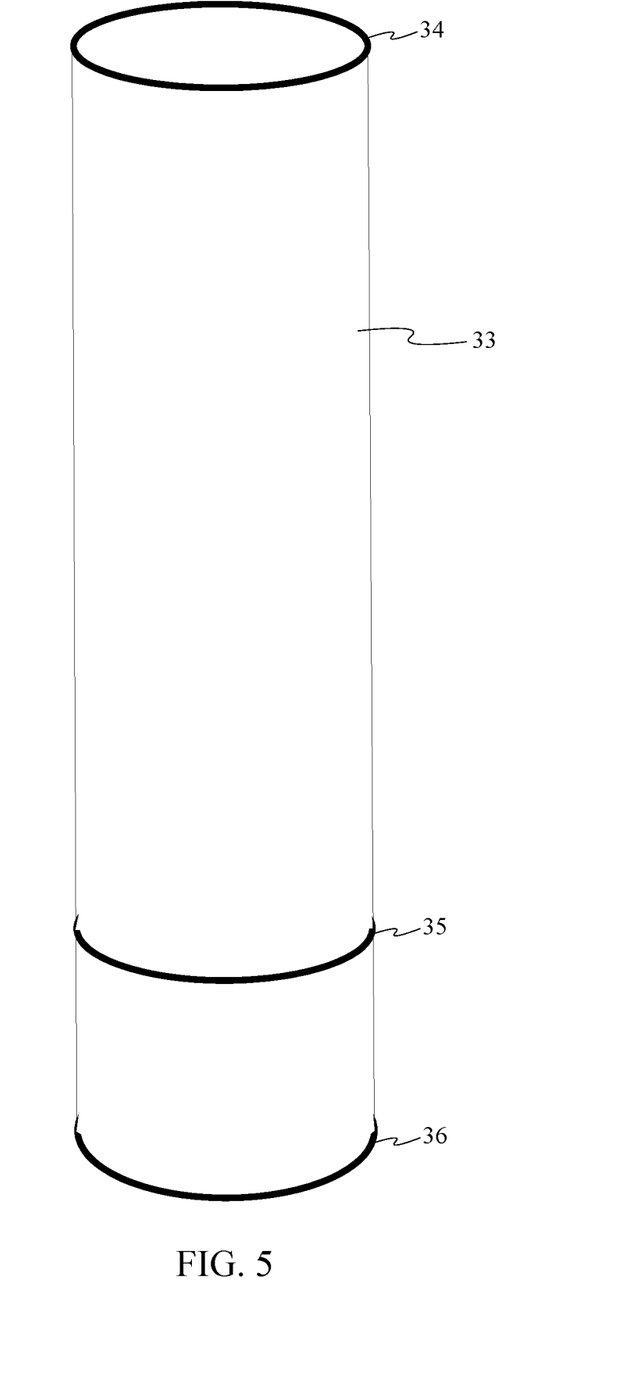
FIG. 5 is an illustration showing one of the tube sections of the extendable catalyst transfer tube of the present invention.
Figure 6:
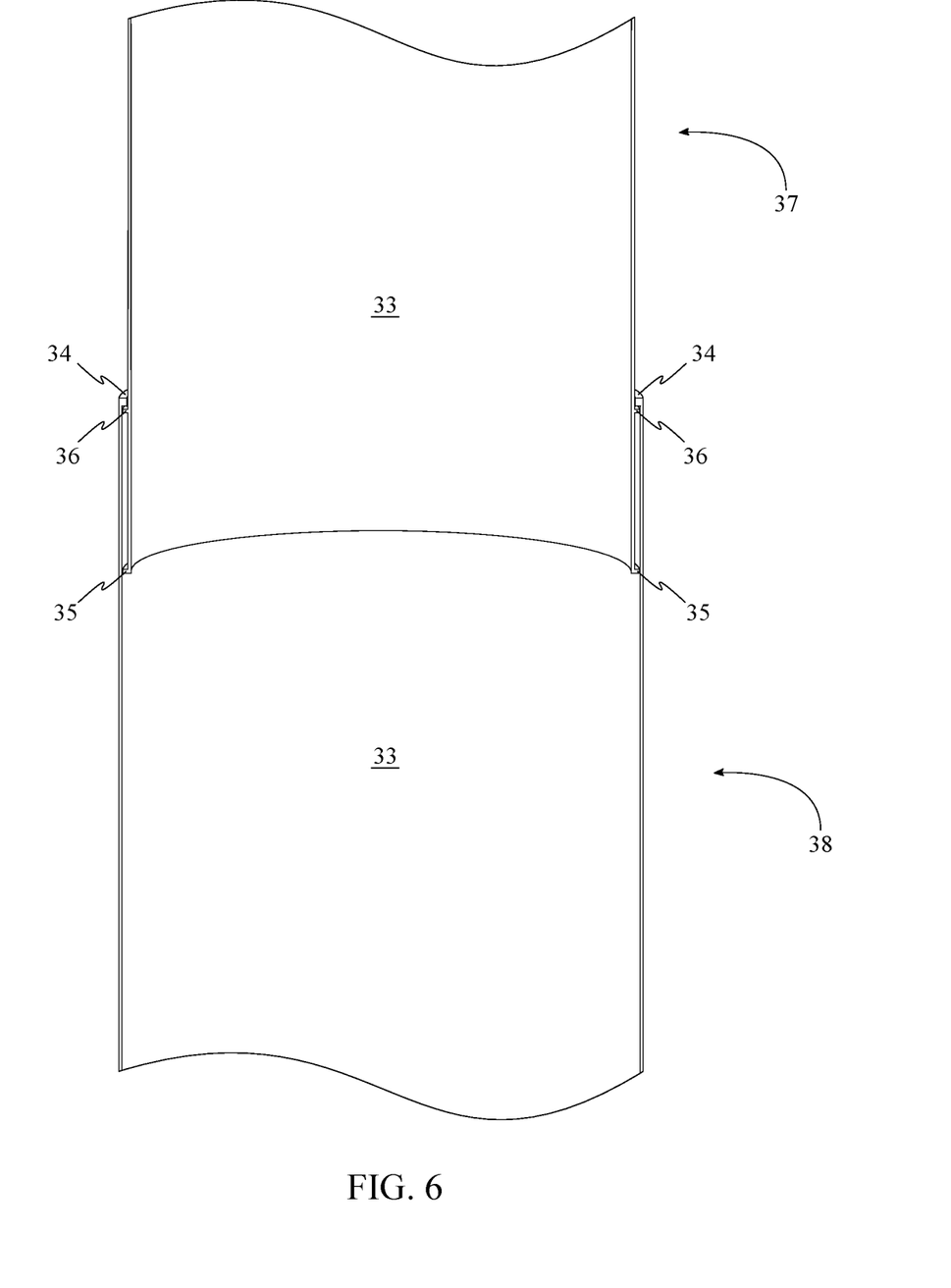
FIG. 6 is an illustration showing a cross-section of one embodiment of the extendable catalyst transfer tube of the present invention.

In the preferred embodiment, each of the series of tube sections 32 comprises a tube body 33, an upper flange 34, a first lower flange 35, and a second lower flange 36. The upper flange 34 and the first lower flange 35 are terminally and concentrically connected to the tube body 33 and are positioned axially opposite each other along the tube body 33. The second lower flange 36 is concentrically connected to the tube body 33 between the upper flange 34 and the first lower flange 35.

The series of tube sections 32 may be understood to comprise an arbitrary tube section 37 and a subsequent tube section 38, wherein the arbitrary tube section 37 precedes the subsequent tube section 38 in the series of tube sections 32. The second lower flange 36 of the arbitrary tube section 37 is positioned axially between the first lower flange 35 of the arbitrary tube section 37 and the upper flange 34 of the subsequent tube section 38, wherein the upper flange 34 of the subsequent tube section 38 abuts against the second lower flange 36 of the arbitrary tube section 37 in the lowered configuration 7. This arrangement of flanges ensured that any given segment of the extendable catalyst transfer tube 3 cannot become dislodged and fall below the bottom edge of the section above it and leave the structure open. In addition, this flange arrangement ensures that the segments of the extendable catalyst transfer tube 3 remain in alignment with each other.

Figure 7:
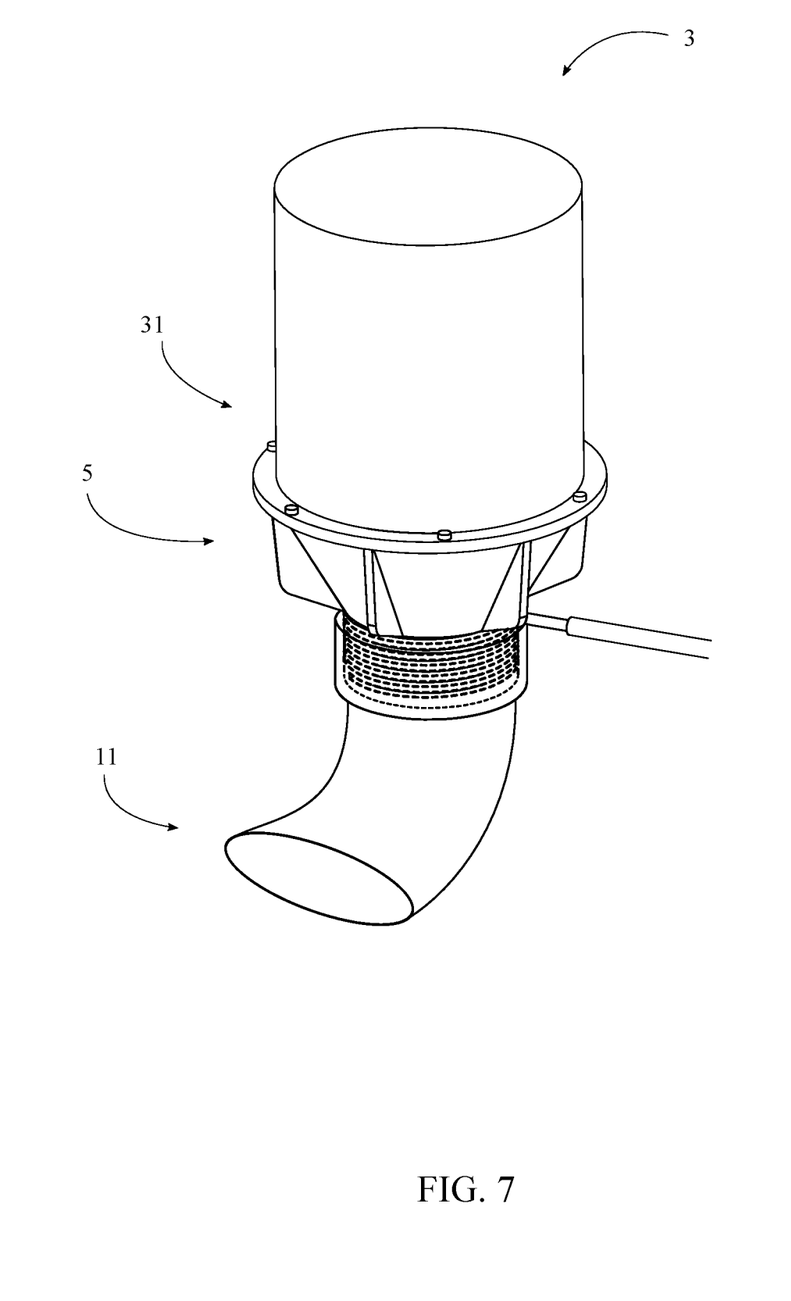
FIG. 7 is an illustration of a flexible sock attachment connected to the catalyst flow control valve of the present invention.

In some embodiments, the present invention may provide a manual loading mechanism. Moreover, in some embodiments, as illustrated in FIG. 7, the present invention further comprises a flexible sock attachment 11. The flexible sock attachment 11 is terminally connected to the catalyst flow control valve 5 at the lower end 31 of the extendable catalyst transfer tube 3, wherein catalyst pellets are dispensed into the chamber 101 from the catalyst control valve through the flexible sock attachment 11. An operator would control the catalyst control valve directly by manually starting and stopping the loading process while distributing the catalyst across the reactor cross section by manually manipulating the flexible sock attachment 11. As the catalyst bed level rises during the loading, the operator would control the top winch 40 and retract the extendable pipe system. In this way, the loading would be continuous without the breaks discussed previously.

Figure 8:
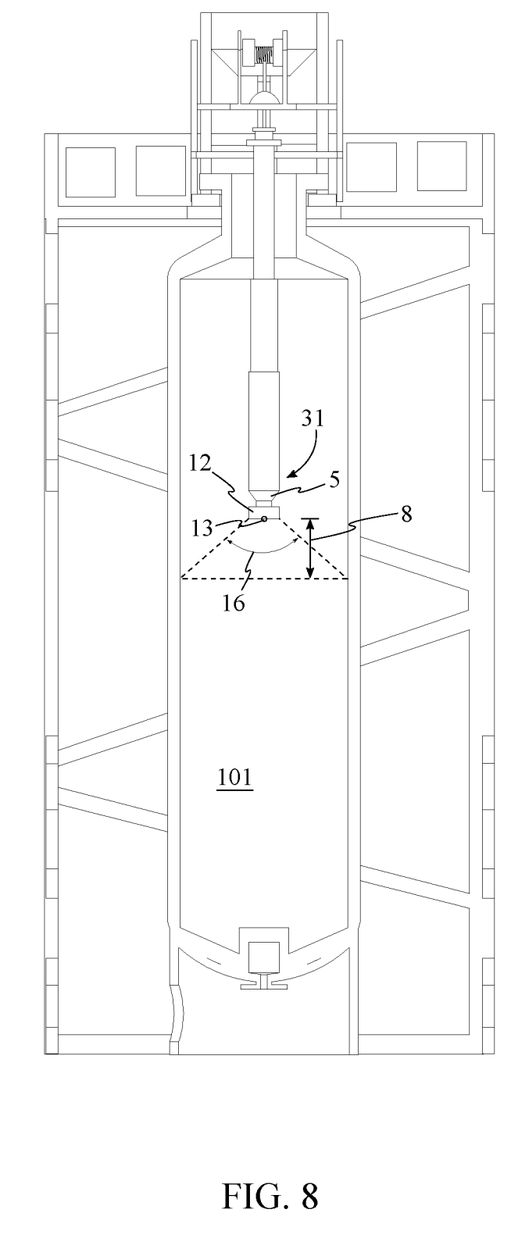
FIG. 8 is an illustration showing one embodiment of the dispersion angle of the present invention with a dense loading machine connected to the catalyst flow control valve.

Alternatively, in some embodiments, referring to FIG. 8, the present invention further comprises a dense loading machine 12. The dense loading machine 12 is a mechanical device known in the art that is configured to ensure uniform distribution of the catalyst throughout the entire diameter of the reactor and a high bulk catalyst density as the catalyst is being loaded.

The dense loading machine 12 is terminally connected to the catalyst flow control valve 5 at the lower end 31 of the extendable catalyst transfer tube 3, wherein the dense loading machine 12 is configured to radially disperse catalyst pellets received through the catalyst flow control valve 5 into the chamber 101 at a specified dispersion angle 16, and wherein the dense loading machine 12 and the catalyst flow control valve 5 form a loading head.

Figure 9:
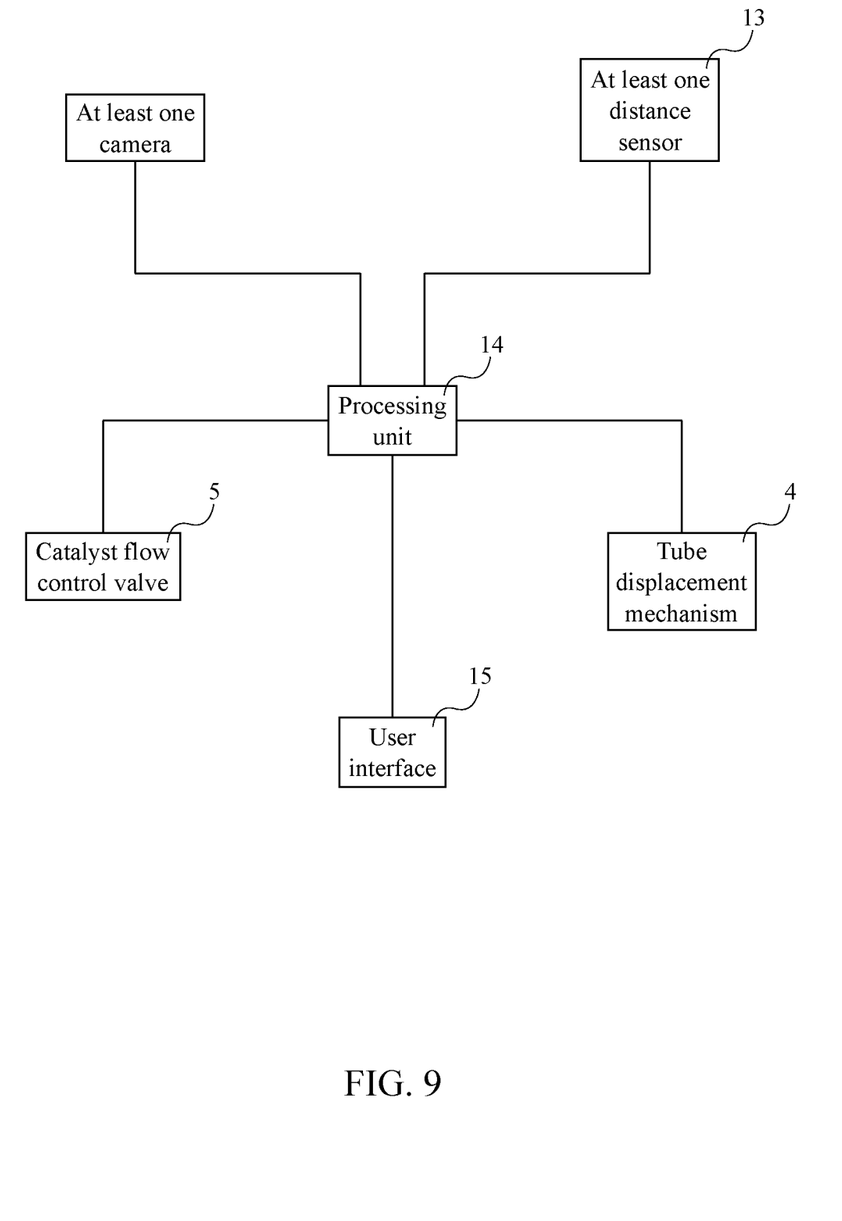
FIG. 9 is a schematic diagram of some of the electrical components of the present invention.

In some embodiments, referring to FIGS. 8-9, the present invention comprises at least one distance sensor 13 and a processing unit 14. The at least one distance sensor 13, and the tube displacement mechanism 4 are electronically connected to the processing unit 14 and are electrically connected to any suitable power source. Preferably, each of the at least one distance sensor 13 is an ultrasonic distance sensor 13, though any suitable type of distance sensor 13 may be utilized as desired in various embodiments.

Each of the at least one distance sensor 13 is positioned on the loading head and configured to measure a catalyst fall distance 8 between the loading head and a catalyst bed height within the chamber 101 of the chemical reactor 1. The processing unit 14 is configured to control the tube displacement mechanism 4 in order to maintain the catalyst fall distance 8 at a constant desired fall distance 8 value or within a predetermined acceptable range of values around the desired fall distance 8 value. This configuration may be further supplemented with one or more cameras for enhanced monitoring and control abilities.

In some other embodiments, the dense loading machine 12 may be controlled remotely from outside the reactor by an operator. To this end, the present invention may further make use of a user interface 15, through which an operator may input control commands to the system. One or more wireless communication devices may further be implemented to enable this functionality, or the electronic communication of the present invention may be performed through wired connections, as suitable and desired in different embodiments and implementation situations.

In some embodiments, the present invention may further include a manual catalyst vacuuming mechanism. The aforementioned extendable catalyst transfer tube 3 may be also to remove old catalyst from within the chamber 101 by vacuuming. For example, a sealed elbow may be fitted to the upper end 30 of the extendable catalyst transfer tube 3. The sealed elbow can be connected to a vacuum generator for catalyst vacuuming.

In some embodiments, the catalyst-handling device may include a mechanical arm, which can be controlled from the top platform 9 of the reactor. As previously mentioned, the present invention may further include one or more cameras configured in such a way that the mechanical arm and progress of the loading/vacuuming can be monitored and controlled by the operator from the top platform 9. In this way, the operator's time in a confined space during the catalyst loading or unloading process would be reduced to the minimum.

Before establishing the catalyst flow to the dense loading machine 12, the present invention may be configured to adjust the rotational speed of the catalyst dispersion to spray the catalyst uniformly across the reactor cross section with a desired dispersion angle 16. The distance set point of the ultrasonic sensors can be set to constant, and the signal from the ultrasonic sensor may control the winch 40 motor can be positioned at the top of the reactor 1. In some embodiments, the present invention may include an operator computing device that may be configured to enable remote control or monitoring of the catalyst loading or unloading. The operator computing device may enable a remotely located operator to monitor information sent from the ultrasound sensors and any other device that may be included in the catalyst-handling device. The operator computing devices can include computers, laptops, tablets, mobile devices, smartphones, cellular phones, or any suitable electronic device. Communication between the operator computing device and the ultrasound sensors can occur via the Internet, cellular networks, telecommunication networks, local area networks, or wireless networks, as desired.

In some embodiments, the ultrasound sensors may communicate with the winch motor controller and/or the operator computing device via a network and send various data to the operator computing device which may include but are not limited to, the levelness of the surface and the total height of the loaded catalyst. These data may be important for calculation of bulk density of the loaded catalyst as well as for monitoring of local density variations. The network communication with the ultrasound sensors may allow operators to monitor loading dynamic and quality of catalyst in real time with the operator computing device. For example, based on the data sent from the ultrasound sensors, loading reports, at any stage of loading, can be generated automatically by the operator computing device.

The network may enable the ultrasound sensors to communicate with the various components of the catalyst-handling device including the winch motor controller and the operator computing device. Some embodiments may enable communication via cellular and/or Wi-Fi networks. Some embodiments may enable communication via the Internet. Several embodiments may enable wired communication between components. The network can include the following communication means: radio, Wi-Fi (e.g., wireless local area network), cellular, Internet, Bluetooth, telecommunication, electromagnetic, infrared, light, sonic and microwave. Other communication means may be used by some embodiments.

When all settings are finalized with the dense loading machine 12 as described, the catalyst flow to the dense loading machine 12 can be established. As the catalyst bed height increases, the ultrasonic sensors can send signals to a winch motor controller and the operator computing device as described, and the winch motor may act in such a way as to maintain the set distance. The operator may monitor the loading dynamic and quality of catalyst in real time as described. The speed of the dense loading machine 12 can be kept constant, and the dispersion angle 16 can also be kept uniform at all times during the loading.

The dense loading mechanism described herein would be beneficial to the industry in many respects, from the increased safety of the operators to the reduction of loading time. Furthermore, the quality of loading will be increased and standardized thanks to the elimination of frequent breaks and the ability to become less dependent on the skills of the loading operators.

Although the invention has been explained in relation to its preferred embodiment, it is to be understood that many other possible modifications and variations can be made without departing from the spirit and scope of the invention as hereinafter claimed.

What is claimed is:

1. A catalyst loading and unloading system for chemical reactors comprising:

a chemical reactor comprising an enclosure, a chamber, and a manway, wherein the chamber is positioned within the enclosure, and wherein the manway traverses concentrically through the enclosure into the chamber;

a catalyst hopper;

an extendable catalyst transfer tube;

a tube displacement mechanism;

a catalyst flow control valve;

the extendable catalyst transfer tube extending between an upper end and a lower end;

the upper end of the extendable catalyst transfer tube being mounted adjacent to the manway;

the extendable catalyst transfer tube axially traversing through the manway into the chamber, wherein the lower end is positioned within the chamber;

the catalyst hopper being connected to the extendable catalyst transfer tube through a hopper discharge tube, wherein the catalyst hopper is configured to dispense catalyst pellets into the extendable catalyst transfer tube through the hopper discharge tube;

the catalyst flow control valve being connected to the lower end of the extendable catalyst transfer tube;

the tube displacement mechanism being operatively connected to the extendable catalyst transfer tube, wherein the tube displacement mechanism is configured to displace the lower end of the extendable catalyst transfer tube between a raised configuration and a lowered configuration, wherein the lower end of the extendable catalyst transfer tube is positioned adjacent to the manway in the raised configuration, and wherein the lower end is displaced away from the manway in the lowered configuration;

a flexible sock attachment; and the flexible sock attachment being terminally connected to the catalyst flow control valve at the lower end of the extendable catalyst transfer tube, wherein catalyst pellets are dispensed into the chamber from the catalyst control valve through the flexible sock attachment.

2. The catalyst loading and unloading system for chemical reactors as claimed in claim 1 comprising:

a platform;

a support frame;

the platform comprising a manway aperture;

the support frame being connected atop the platform adjacent to the manway aperture;

the manway of the chemical reactor traversing through the manway aperture of the platform; and the tube displacement mechanism and the upper end of the extendable catalyst transfer tube being mounted to the support frame.

3. The catalyst loading and unloading system for chemical reactors as claimed in claim 1 comprising:
the tube displacement mechanism comprising a winch and a cable; and
the cable being connected between the winch and the lower end of the extendable catalyst transfer tube, wherein the lower end of the extendable catalyst transfer tube is displaced between the raised configuration and the lowered configuration by extending and retracting the cable with the winch.

4. The catalyst loading and unloading system for chemical reactors as claimed in claim 3 comprising:
the cable being connected between the winch and the catalyst flow control valve.

5. The catalyst loading and unloading system for chemical reactors as claimed in claim 3 comprising:
the cable traversing from the winch into the extendable catalyst transfer tube, internally through the extendable catalyst transfer tube, to the catalyst control valve.

6. The catalyst loading and unloading system for chemical reactors as claimed in claim 1 comprising:
the extendable catalyst transfer tube comprising a series of tube sections, wherein the series of tube sections progresses from the upper end to the lower end of the extendable catalyst transfer tube; and
the series of tube sections being telescopically engaged with each other, wherein the series of tube sections is telescopically collapsed in the raised configuration.

7. The catalyst loading and unloading system for chemical reactors as claimed in claim 6 comprising:
each of the series of tube sections comprising a tube body, an upper flange, a first lower flange, and a second lower flange;
the upper flange and the first lower flange being terminally and concentrically connected to the tube body, opposite each other along the tube body; and
the second lower flange being concentrically connected to the tube body between the upper flange and the first lower flange.

8. The catalyst loading and unloading system for chemical reactors as claimed in claim 7 comprising:
the series of tube sections comprising an arbitrary tube section and a subsequent tube section, wherein the arbitrary tube section precedes the subsequent tube section in the series of tube sections; and
the second lower flange of the arbitrary tube section being positioned axially between the first lower flange of the arbitrary tube section and the upper flange of the subsequent tube section, wherein the upper flange of the subsequent tube section abuts against the second lower flange of the arbitrary tube section in the lowered configuration.

9. The catalyst loading and unloading system for chemical reactors as claimed in claim 1 comprising:
a dense loading machine;
at least one distance sensor;
a processing unit;
the dense loading machine being terminally connected to the catalyst flow control valve at the lower end of the extendable catalyst transfer tube, wherein the dense loading machine is configured to radially disperse catalyst pellets received through the catalyst flow control valve into the chamber at a specified dispersion angle, and wherein the dense loading machine and the catalyst flow control valve form a loading head;
the at least one distance sensor, the user interface, and the tube displacement mechanism being electronically connected to the processing unit;
each of the at least one distance sensor being positioned on the loading head and configured to measure a catalyst fall distance between the loading head and a catalyst bed height within the chamber; and
the processing unit being configured to control the tube displacement mechanism in order to maintain the catalyst fall distance at a desired fall distance value.

* * * * *